United States Patent [19]

Lenhart

[11] Patent Number: 4,773,522
[45] Date of Patent: Sep. 27, 1988

[54] VACUUM DEADPLATE

[75] Inventor: Ronald A. Lenhart, Lakewood, Colo.

[73] Assignee: Meyer Conveyair, Inc., Arvada, Colo.

[21] Appl. No.: 7,007

[22] Filed: Jan. 27, 1987

Related U.S. Application Data

[63] Continuation-in-part of Ser. No. 700,748, Feb. 12, 1985, Pat. No. 4,669,604.

[51] Int. Cl.⁴ ............................................. B65G 47/26
[52] U.S. Cl. ................................... 198/425; 198/428; 198/600; 198/689.1; 414/59; 193/40; 406/84
[58] Field of Search .................... 198/689.1, 600, 493, 198/428, 425; 414/59, 73, 86, 89; 193/32, 40; 271/183, 121, 72, 59; 15/306 B; 406/83, 84

[56] References Cited

U.S. PATENT DOCUMENTS

| 2,919,789 | 1/1960 | Coakley | 271/183 |
|---|---|---|---|
| 3,300,065 | 1/1967 | Witmer . | |
| 3,352,404 | 11/1967 | DiSettembrini . | |
| 3,664,483 | 5/1972 | Revaz . | |
| 3,788,497 | 1/1974 | Carlson | 414/89 |
| 3,827,548 | 8/1974 | Matsuo | 198/689.1 |
| 3,854,567 | 12/1974 | Poupin et al. | 198/428 |
| 3,975,057 | 8/1976 | Hurd | 406/84 |
| 3,976,329 | 8/1976 | Adams et al. | 193/40 |
| 4,136,767 | 1/1979 | Sarovich . | |
| 4,146,467 | 5/1979 | Sauer et al. . | |
| 4,165,132 | 8/1979 | Hassan et al. | 271/183 |
| 4,560,060 | 12/1985 | Lenhart . | |
| 4,669,604 | 6/1987 | Lenhart | 198/433 |

Primary Examiner—Robert J. Spar
Assistant Examiner—Jennifer L. Doyle
Attorney, Agent, or Firm—Fields, Lewis, Pittenger & Rost

[57] ABSTRACT

A vacuum deadplate is provided which has a surface with a low coefficient of friction and spaced longitudinal slots through which a vacuum can be drawn. The vacuum deadplate can be used in conjunction with a vacuum transfer device or a palletizing device and the position of the vacuum plenum slot under the longitudinal slots can be varied to provide optimum results.

9 Claims, 3 Drawing Sheets

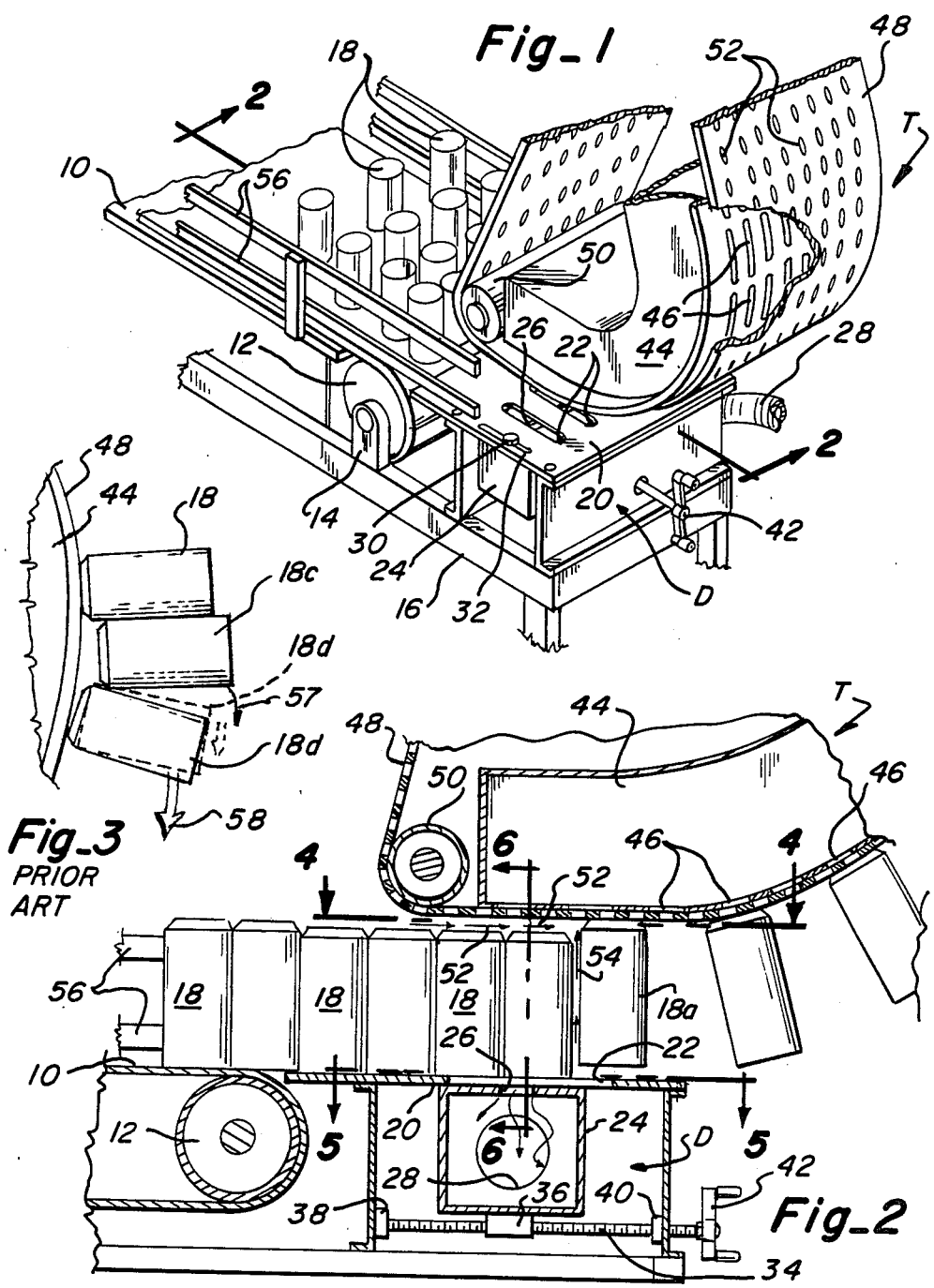

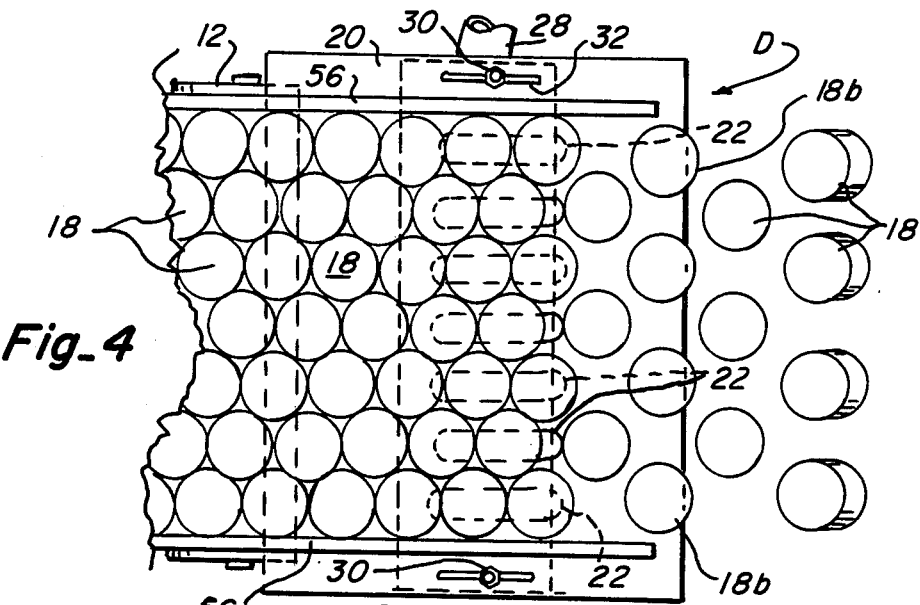
Fig_4
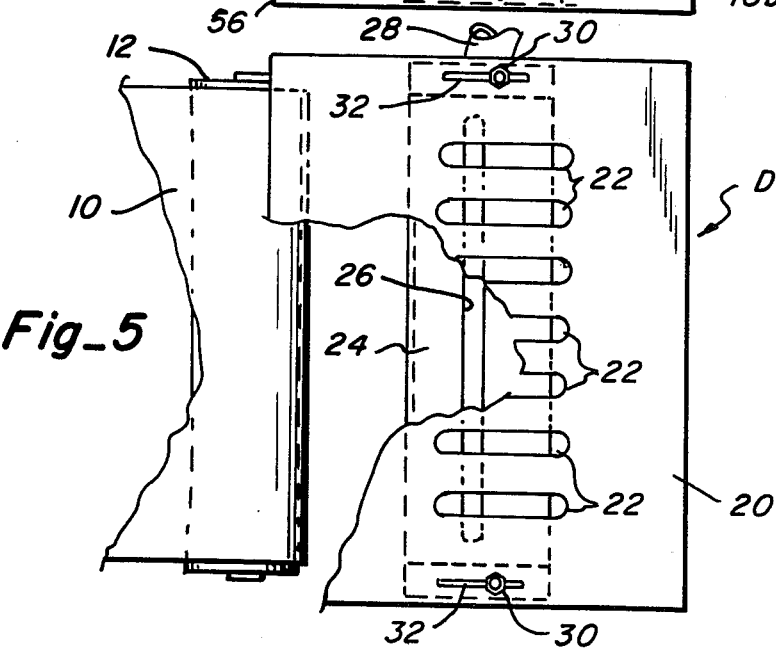
Fig_5
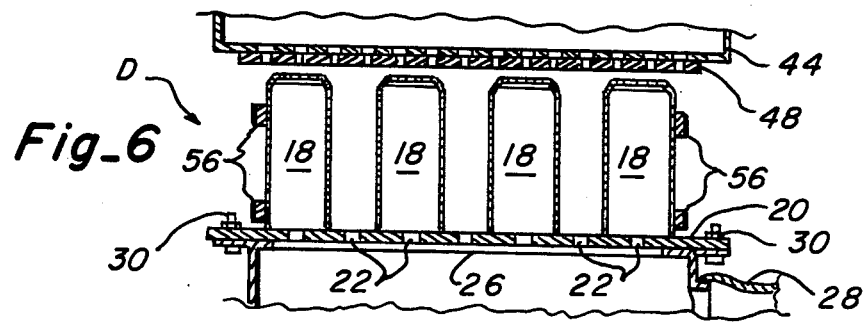
Fig_6

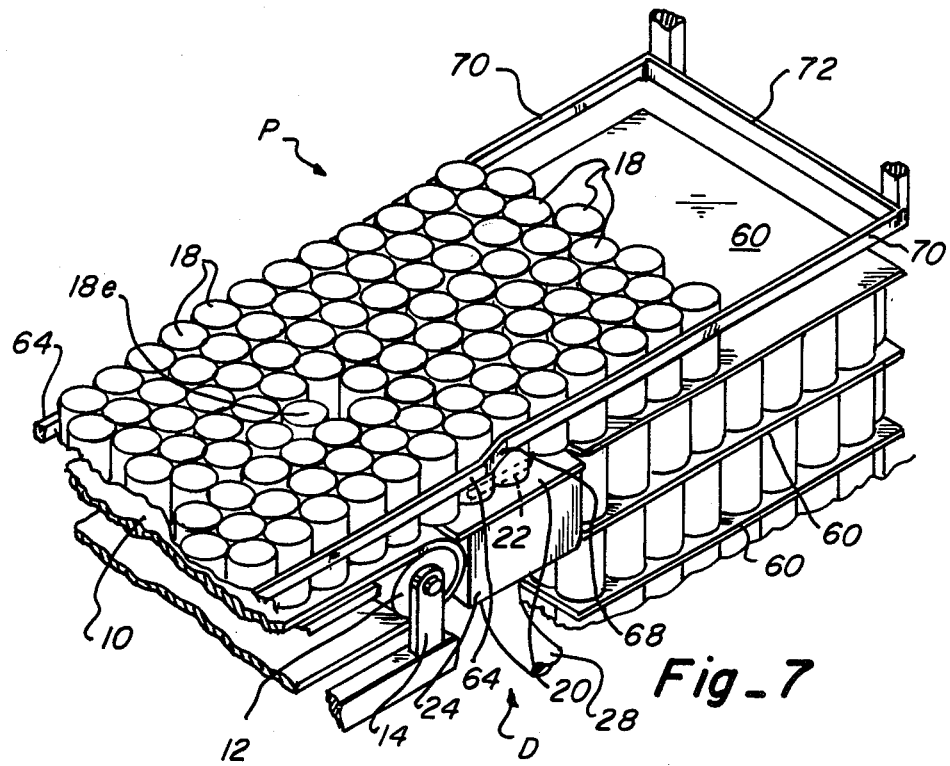
Fig_7
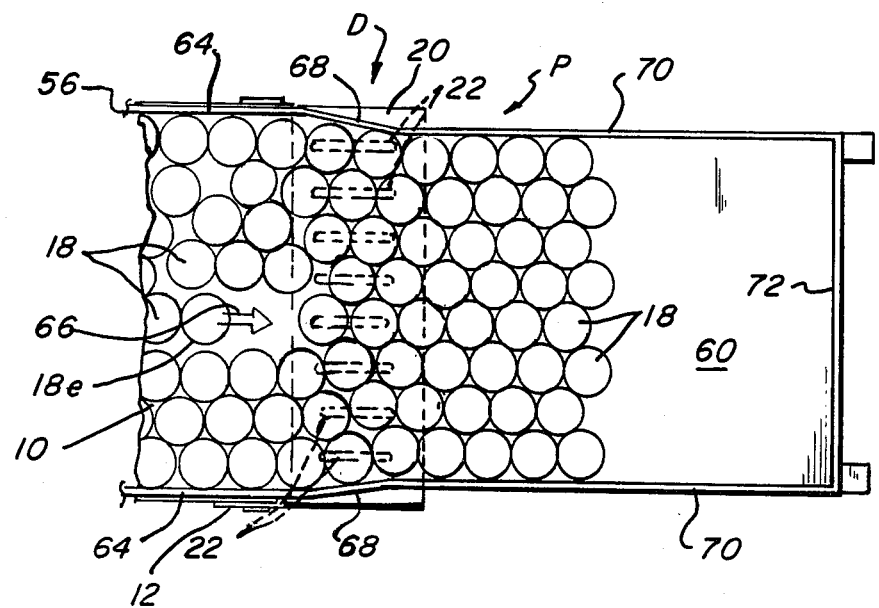
Fig_8

VACUUM DEADPLATE

This application is a continuation-in-part of my copending U.S. patent application Ser. No. 700,748 for "Vacuum Single Filer", filed Feb. 12, 1985, now U.S. Pat. No. 4,669,604.

FIELD OF THE INVENTION

This invention relates to a vacuum deadplate and more particularly to a vacuum deadplate for use in assisting in the transfer of containers from a mass conveyor to a vacuum transfer device or a palletizer.

BACKGROUND ART

Deadplates are commonly used at the transition point from a first mass conveyor running at one predetermined speed and a second mass conveyor running at a second but higher speed in order to obtain separation of the containers or articles on the conveyor. This is particularly necessary when the next conveyor which the containers will encounter is a vacuum conveyor which will lift the containers up and transport them to another station. The reason for the necessity for speed change is to provide longitudinal separation of the articles so that each properly oriented article will be drawn by the vacuum against the vacuum transfer device, rather than being held by adjacent cans due to the Coanda Effect, which is the wall attachment effect caused by a stream of fast moving air, moving along a surface creating a partial vacuum which tends to draw any adjacent articles toward that surface. While the structure just described is satisfactory for its intended purposes, one of the disadvantages is that it requires substantial room within the plant for the higher speed conveyor and in some plant arrangements, there is simply not enough room for including a second conveyor. The prior art arrangement just described is illustrated in U.S. Pat. No. 3,664,483 to Revaz for "Method of and Apparatus For Releasing Objects to a Transporting Device".

A conventional vacuum transfer device for conveying containers from one elevation to another is disclosed in U.S. Pat. No. 4,136,767 to Sarovich entitled "Vacuum Operated Can-Conveying and Can-Uprighting Apparatus". In this device there is no longitudinal separation of the containers at all. Thus, if one of the containers is held by the other containers due to the Coanda Effect rather than being held by the vacuum, as the containers move around the drum, the weight of the container which is not held by the vacuum may be sufficient to dislodge other containers and cause them to fall off of the vacuum transfer device.

A vacuum transfer apparatus for transferring containers which have already been separated longitudinally is shown in U.S. Pat. No. 4,146,467 to Sauer, et al., entitled "Apparatus for Detecting and Rejecting Downed and Damaged Containers". Thus, in order for this device to operate satisfactorily, there must be provided between the mass conveyor and this device a conveyor which accelerates the containers to provide the necessary longitudinal separation.

Another vacuum transfer device is shown in my U.S. Pat. No. 4,560,060 for "Vacuum Belt Conveyor". In this device, the containers are supplied to the vacuum transfer belt from a mass conveyor in which the containers are in contiguous relationship. The vacuum transfer conveyor operates at a higher speed than the mass conveyor thereby separating the containers as they are moved to a downstream conveyor. The purpose of this separation is to allow the misaligned and damaged containers to be discharged from the apparatus. The device works well for its intended purpose. However, under certain operating conditions, and particularly when the containers are supplied with the open end down, it is possible for a leading container, as it is being drawn up to the vacuum belt, to pull with it one or more trailing containers because of the Coanda Effect whereupon those containers will not be held against the vacuum belt by the vacuum but will tend to fall off. If the containers have not been necked or flanged, the open mouth has a raw edge. When they are being fed with the open mouth down, as they are lifted from the conveyor belt to a faster moving transfer belt, the edge of the open mouth of the container may "trip" on the conveyor belt and tip over or jam which will cause subsequent containers also to be tipped over.

Another vacuum conveyor is shown in my co-pending and commonly owned U.S. application Ser. No. 663,178 filed Oct. 22, 1984 for "Curved Vacuum Transfer Conveyor", now abandoned, wherein containers are transferred from a mass conveyor to a curved vacuum conveyor which picks up the containers and carries them around a curved plenum to a discharge conveyor at a different elevation. With this apparatus the same difficulties just described above can occur. As the leading containers are lifted by the vacuum transfer belt, the upstream containers, trailing on the mass conveyor belt can be drafted along with the leading containers due to the Coanda Effect. Thus, the leading containers are drawn tightly against the vacuum transfer belt, whereas the trailing containers may not. This is a particularly troublesome problem with highly etched bright containers because of the high coefficient of friction between the surfaces of the containers causes them to tend to stick together. As a result, as the containers move around the belt, the weight of the unattached trailing containers can cause them to fall away and pull with them additional containers so that they are not properly transferred to the next downstream station. Furthermore, if the mouths of the containers are down, they can trip on the conveyor belt as they are drafted forwardly causing them to tip over and causing other containers approaching from behind to be tipped over or otherwise disrupted from their normal path of travel.

A vacuum alignment device is provided in U.S. Pat. No. 3,352,404 to Di Settembrini, entitled "Devices for Stabilizing Light Objects on Conveyor Belts" wherein articles are dropped onto a moving conveyor belt from above the belt and a vacuum device is provided to hold the containers in upright condition and to bring them into single file alignment through a guide means. This device is not intended to align containers on a mass conveyor prior to being lifted by a vacuum conveyor.

A form of vacuum deadplate is shown in my co-pending and commonly owned U.S. patent application Ser. No. 700,748 filed Feb. 12, 1985, entitled "Vacuum Single Filer", now U.S. Pat. No. 4,669,604. However, this vacuum deadplate is for the purpose of helping discharge aligned diagonal rows of containers from a mass conveyor in a precise predetermined alignment so that they can be brought into single file alignment along a subsequent vacuum belt. The vacuum deadplate shown therein is not used to hold the containers in a particular alignment prior to being lifted up by a vacuum transfer conveyor belt.

It is often desirable to move containers from a mass conveyor onto pallets in parallel nested rows in contiguous relationship. One such device for accomplishing this arrangement is shown in U.S. Pat. No. 3,300,065 to Witmer, entitled "Means for Material Handling". The containers move from a mass conveyor past converging sidewalls which direct the containers into a palletizing area. The containers move to the distal end of the palletizing area where they are retained by a vertical wall. Succeeding containers move in behind the first containers and fill up the area until the pallet layer is full. One of the difficulties with this arrangement is that sometimes all of the open areas will not be filled in and containers will be missing from one or more locations in a pallet layer when the last row has been filled in. This is caused because the containers do not readily move past each other into the vacant spaces, particularly when the containers have a bright finish which creates a lot of friction between the surfaces of adjacent containers.

DISCLOSURE OF THE INVENTION

In accordance with this invention, a vacuum deadplate is provided for holding articles in a predetermined pattern as they are moved from a mass conveyor at an upstream location to a downstream location. The vacuum deadplate comprises a flat metal plate extending transversely across the discharge end of the mass conveyor. Spaced openings are located across the plate and means for drawing a vacuum through the plate openings are provided so that the articles are held in precise fixed alignment for further work to be performed on them at the downstream location as they are pushed across the plate by other articles on the mass conveyor. The spaced openings may be longitudinal slots and means may be provided to longitudinally adjust the position of the vacuum drawing means under the slots. The vacuum drawing means includes a transversely mounted plenum under the plate and a transverse slot in the plenum extending transversely under a portion of each of the longitudinal slots. The plate has a surface whose coefficient of friction is low with respect to the articles, so that the articles slide easily thereacross and do not trip.

In one form of the invention, an overhead vacuum pickup station is provided at the downstream location to transfer the articles from the vacuum deadplate. Means may be provided to longitudinally adjust the position of the transverse slots below the longitudinal slots to provide the optimum pickup point for the vacuum pickup station.

In another form of the invention, converging side guide rails are provided at the deadplate for bringing the articles into contiguous nested rows. A palletizer can be provided at the downstream location which includes a slip sheet for receiving the articles and guide means above the slip sheet for holding the contiguous nested rows of articles together after they pass by the converging guide rails.

When the present invention is used with a vacuum pickup station, the vacuum deadplate assures that the trailing articles do not get drafted along with the leading articles which are being drawn up to the vacuum deadplate resulting in the likelihood that they will drop off the vacuum transferring means, possibly stripping other containers from the vacuum transfer device. This drafting of the trailing articles is caused by the Coanda Effect and also by the movement of air in the direction of the movement of containers into the vacuum transfer plenum.

When the deadplate of this invention is used with a palletizer, the deadplate, together with the converging side guides, serves to bring the mass of containers into longitudinal contiguous nested rows so that they are supplied to the palletizer in a tight mass so that the possibility of an article being absent from one of the rows is minimized.

Additional advantages of this invention will become apparent from the description which follows, taken in conjunction with the accompanying drawings.

BRIEF DESCRIPTION OF THE DRAWINGS

FIG. 1 is a fragmentary perspective view of the vacuum deadplate of this invention as it is used with a vacuum transfer device;

FIG. 2 is an enlarged, horizontal section along line 2—2 of FIG. 1, showing how the vacuum deadplate holds the trailing articles as the leading articles are picked up by the vacuum transfer device;

FIG. 3 is a fragmentary side elevation of a prior art curved vacuum transfer device showing how a drafted trailing device may be caused to fall off the transfer device and strip other containers as it falls;

FIG. 4 is an enlarged horizontal section, taken along 4—4 of FIG. 2, showing how the containers are positioned by the vacuum deadplate and their arrangement as they are picked up by the vacuum transfer device;

FIG. 5 is a horizontal section, taken along line 5—5 of FIG. 2, showing further details of the vacuum deadplate, with parts broken away for clarity of illustration;

FIG. 6 is a vertical section, taken along line 6—6 of FIG. 2, showing the arrangement of the containers on the deadplate prior to being picked up by the vacuum transfer device;

FIG. 7 is a fragmentary perspective view of the vacuum deadplate of this invention used in conjunction with a palletizer; and FIG. 8 is a top plan view of FIG. 7, showing how the vacuum deadplate in the converging side guides bring the containers onto longitudinal nested rows as they move into the palletizer.

BEST MODE FOR CARRYING OUT THE INVENTION

In one form of the invention, a vacuum deadplate assembly "D" is provided for use with a vacuum transfer device as shown in FIG. 1. Containers are supplied to the deadplate assembly "D" from a mass conveyor belt 10 which extends around a roller 12 at the discharge end thereof. The roller is journaled in brackets 14 mounted on a frame 16. Articles, such as containers 18, are pushed by conveyor belt 10 onto the surface of deadplate 20. The surface of deadplate 20 is made such that the coefficient of friction between it and the open end of containers 18 is very low so that the containers will slide across the deadplate without tending to trip. It has been found that by making the deadplate of stainless steel and polishing it to a high degree such a low coefficient of friction can be obtained.

The deadplate includes a plurality of longitudinal slots 22 spaced laterally across the deadplate. Below deadplate 20 is an adjustable vacuum plenum 24 which includes a transverse slot 26. A vacuum is drawn in the vacuum plenum 24 by means of a suitable fan (not shown) as through an exhaust tube 28. As illustrated in FIG. 1, the vacuum plenum includes support pins 30 mounted in guideways 32 of deadplate 20 which support the plenum for longitudinal adjustment in the upstream or downstream direction with respect to longitudinal slots 22. The adjustment is accomplished by means of a threaded rod 34 which extends through a threaded sleeve 36 on the bottom of vacuum plenum 24 and is journaled in mounts 38 and 40, as shown. The threaded rod may be rotated by means of handle 42 attached to the extending end thereof.

As illustrated, the overhead vacuum transfer station "T" includes a curved vacuum plenum 44 having spaced longitudinal slots 46 through which air is drawn. A transfer belt 48 extends along the surface of plenum 44 and around a roller 50. This belt has longitudinal rows of openings 52 through which air is drawn into slots 44 for lifting and holding the containers to transfer them from one location to another. As will be apparent, when air is drawn into the plenum, some of the drawn air will move across the top of the containers in the direction of arrows 52. Thus, in the absence of vacuum deadplate assembly "D" this movement of air would tend to draft the containers downstream. Also, because of the Bernoulli Principal, as leading containers are picked up by the vacuum belt, trailing containers also will tend to be drafted along with the leading container and held thereagainst due to the rapid vertical movement of air between the containers as illustrated by arrow 54.

However, with the present invention, the air being drawn through longitudinal slots 22 in plate 20 hold the trailing containers in fixed position as the leading container, such as container 18a is picked up by transfer belt 48. Also, transfer belt 48 can run at a higher speed than mass conveyor belt 10 so that longitudinal spacing of the containers occurs to further minimize the drafting of one container against another. Because of the vacuum drawn by the vacuum deadplate assembly "D" and the constraint of vertically spaced side rails 56, the containers 18 are held in a tightly nested configuration, as best seen in FIG. 4, as they are pushed across the deadplate by conveyor belt 10. As the leading containers are pushed beyond slots 22, they will be lifted onto the vacuum transfer belt 48 in a uniform spaced pattern.

It will also be noted that because of the air being drawn through vacuum transfer belt 48 along its length, the containers will tend to be moved toward the low pressure, which is at the center of the belt in accordance with the Bernoulli Principal. This can be observed in FIG. 4 wherein downstream containers 18b have moved inwardly away from side rails 56 as compared to their upstream counterparts. With this arrangement, there is less possibility that the leading containers will drag on the side rails into close proximity with the trailing containers so that they will be drafted against the leading containers.

The arrangement just described is clearly distinguishable over the prior art arrangement shown in FIG. 3 wherein a trailing container 18c is depicted as being adhered to a leading container 18 due to the Bernoulli Principal so that its mouth is not against conveyor belt 48. Thus, as this container moves around plenum 44, it may be pulled away from container 18 by the force of gravity, as indicated by arrow 57, and therefore strip additional containers below it from the belt as it falls. Furthermore, as the closely packed containers move around the curvature of belt 48, container 18c will pry container 18d off of the belt and cause it to fall, as illustrated by arrow 58.

Although, the vacuum transfer device has been illustrated as a curved vacuum conveyor, it will be understood that the invention will work equally well with a flat vacuum transfer conveyor.

The present invention also has utility with a palletizing assembly "P" as shown in FIGS. 7 and 8. For shipping, containers are placed in nested rows on slip sheets, such as slip sheets 60 shown in FIG. 7 for stacking and packaging for transportation from a container manufacturing plant to a canning plant. The slip sheets 60 are made of a liquid impervious material of low coefficient of friction, such as Teflon and provide a support for and a spacer between stacked pallet layers of containers. In a conventional palletizing apparatus, the containers are allowed to move onto the pallet randomly and to fill in the spaces until the pallet is full. Unfortunately, sometimes all of the spaces are not filled and there are open areas in the pallet which contain no containers. These open spaces result in additional packaging and transportation costs which can be minimized by the use of the present invention.

As best seen in FIG. 8, with the present invention the deadplate causes the containers on conveyor belt 10 to be backed up and because of the spacing of guide rails 64, the empty spots can be filled in, such as by container 18e moving downstream as indicated by arrow 66, whereupon the side rails have a converging portion 68 over deadplate 20 which brings the containers into tightly nested configuration whereupon they are pushed onto slip sheet 60 and held in the nested configuration by the pallet side guide 70 and end rail 72 to form a full pallet layer.

From the foregoing the advantages of this invention are readily apparent. In one form of the invention the vacuum deadplate is used in conjunction with a vacuum transfer device for holding the trailing containers so that they are not drafted forward by the Coanda Effect or by the flow of air into the vacuum transfer device, with a leading container which is being picked up by the vacuum transfer device. The vacuum plenum is adjustable under slots in the vacuum deadplate to precisely position the vacuum under the articles so that maximum results are obtained. In addition, the articles are longitudinally and laterally spaced by the differential speed of the belt and the nesting of the containers as they move across the deadplate.

In another embodiment, the vacuum deadplate of this invention is used with a palletizing apparatus wherein the containers are caused to be nested by converging side guides above the vacuum deadplate which brings the containers into tightly packed contiguous rows so that the possibility of open spaces not being filled with containers is minimized.

This invention has been described in detail with reference to particular embodiments thereof, but it will be understood that various other modifications can be effected within the spirit and scope of this invention.

I claim:

1. A vacuum deadplate for holding articles in a predetermined pattern as they are moved from a mass conveyor at an upstream location to a downstream location, said vacuum deadplate comprising:
   a flat plate extending transversely across the discharge end of the mass conveyor;
   spaced longitudinal slots across said plate;
   a transversely mounted vacuum plenum under said plate;

a transverse slot in said plenum extending transversely under only a portion of each of said longitudinal slots;

means for drawing a vacuum in said plenum so that articles are held in precise fixed alignment for further work to be performed on them at said downstream location; and an overhead vacuum pickup station at said downstream location to pick up and transfer the articles from said vacuum deadplate.

2. Apparatus, as claimed in claim 1, further including:

means to longitudinally adjust the position of said transverse slot below said longitudinal slots to vary the point at which the articles are picked up off said deadplate.

3. A vacuum deadplate for holding articles in a predetermined pattern as they are moved from a mass conveyor at an upstream location to a downstream location, said vacuum deadplate comprising:

a flat plate extending transversely across the discharge end of the mass conveyor;

spaced longitudinal slots across said plate;

a transversely mounted vacuum plenum under said plate;

a transverse slot in said plenum extending transversely under only a portion of each of said longitudinal slots;

means for drawing a vacuum in said plenum so that articles are held in precise fixed alignment for further work to be performed on them at said downstream location; and converging side guide rails at said deadplate for bringing the articles into contiguous nested rows.

4. Apparatus, as claimed in claim 3, further including a palletizer at said downstream location which includes:

a slip sheet for receiving the articles; and guide means above said slip sheet for holding the contiguous nested rows of articles together after they pass by said converging guide rails.

5. A vacuum transfer conveyor apparatus for transferring vertically-arranged articles in random mass from a first station to a second station, spaced from the first station, by means of a vacuum transfer belt, said apparatus comprising:

first conveyor means for supplying the articles to said first station en masse;

a vacuum plenum having a wall spaced above said first station a distance slightly greater than the height of the articles and extending to the second station;

a transfer belt;

means for moving said transfer belt across said wall of said vacuum plenum;

means for drawing a vacuum in said plenum;

spaced apertures in said plenum wall through which sufficient CFM and air flow velocity is drawn to lift the articles from said first station and to hold each article against said transfer belt to transfer the articles to said second station;

a plurality of spaced openings in said transfer belt arranged to overlay said plenum aperture through which air can be drawn to lift the articles;

a deadplate at said first station across which the articles are pushed by said first conveyor means;

spaced openings across said deadplate; and means for drawing a vacuum through said deadplate openings to hold the articles against said deadplate so that the articles are released at a precise location to be picked up on said vacuum transfer belt.

6. Apparatus, as claimed in claim 5 wherein:

said spaced openings in said deadplate include spaced longitudinal slots; and means is provided to longitudinally adjust the position of said vacuum drawing means under said slots.

7. Apparatus, as claimed in claim 6, wherein said vacuum drawing means includes:

a transversely mounted vacuum plenum under said deadplate.

8. Apparatus, as claimed in claim 5, wherein:

said deadplate has a surface whose coefficient of friction is low with respect to the articles so that the articles slide easily thereacross.

9. Apparatus, as claimed in claim 5, wherein:

said transfer belt is movable at a faster rate of speed than said first conveyor means to provide longitudinal separation of the articles.

* * * * *